(12) United States Patent
Dalke et al.

(10) Patent No.: US 9,820,234 B2
(45) Date of Patent: Nov. 14, 2017

(54) ECONOMICAL MOTOR VEHICLE OPERATION DURING A PARKED PHASE

(71) Applicant: Audi AG, Ingolstadt (DE)

(72) Inventors: Christoph Dalke, Kipfenberg (DE); Michael Schmailzl, Kösching (DE); Friedhelm Hirschburger, Ingolstadt (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 15/303,507

(22) PCT Filed: May 28, 2015

(86) PCT No.: PCT/EP2015/001092
§ 371 (c)(1),
(2) Date: Oct. 11, 2016

(87) PCT Pub. No.: WO2015/185196
PCT Pub. Date: Dec. 10, 2015

(65) Prior Publication Data
US 2017/0094605 A1 Mar. 30, 2017

(30) Foreign Application Priority Data

Jun. 7, 2014 (DE) ........................ 10 2014 008 619

(51) Int. Cl.
*H04M 1/00* (2006.01)
*H04W 52/02* (2009.01)
(Continued)

(52) U.S. Cl.
CPC ..... *H04W 52/0274* (2013.01); *B60R 16/0315* (2013.01); *H04B 1/3822* (2013.01); *H04W 52/0248* (2013.01)

(58) Field of Classification Search
CPC .......... H04W 52/0274; H04W 52/0248; B60R 16/0315; H04B 1/3822
See application file for complete search history.

(56) References Cited

U.S. PATENT DOCUMENTS 6,339,397 B1    1/2002  Baker
7,715,840 B2 *  5/2010  Shinoda ................ H04W 60/04
                                                    455/433
(Continued)

FOREIGN PATENT DOCUMENTS

DE    10255449 A1    6/2004
DE    10347839 A1    4/2005
(Continued)

OTHER PUBLICATIONS

International Search Report and Written Opinion directed to related International Patent Application No. PCT/EP2015/001092, with attached English-language translation, dated Sep. 7, 2015; 20 pages.

(Continued)

*Primary Examiner* — Md Talukder
(74) *Attorney, Agent, or Firm* — Sterne, Kessler, Goldstein & Fox P.L.L.C.

(57) ABSTRACT

The invention relates to a method for operating a control unit of a motor vehicle during a parked phase. It is the object of the invention to achieve an economical operation during the parked phase and in so doing to perform the service routine. For this purpose, the power supply sets a timer of a clock in the parked phase and then switches itself off. The timer generates a wake-up signal as a function of a current time indication determined by the clock, and a wake-up device of the power supply switches the power supply on again as a function of the wake-up signal. The power supply that has been switched on again then electrically connects the monitoring unit to the on-board network.

16 Claims, 3 Drawing Sheets

Figure 1:
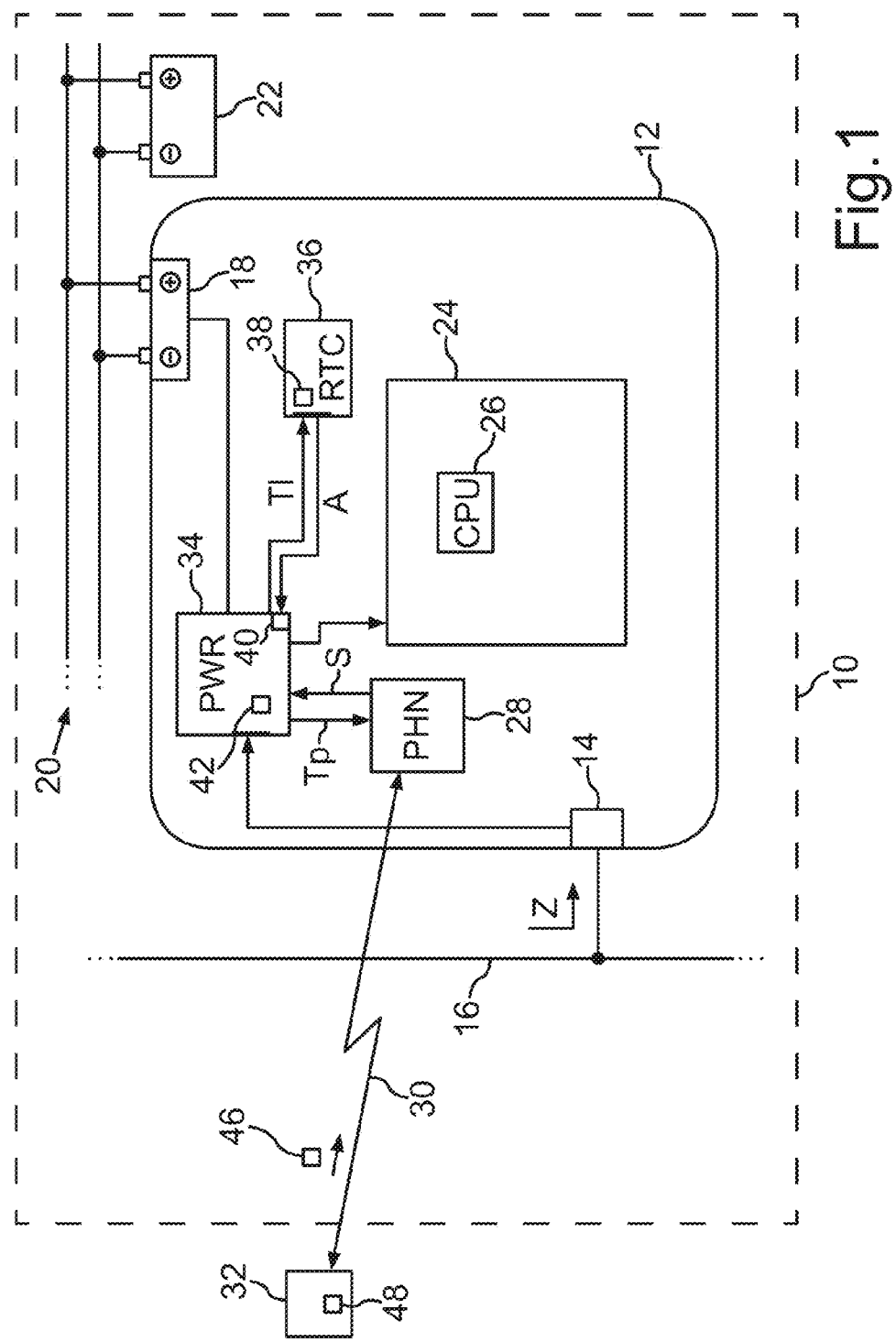

(51) Int. Cl.
*H04B 1/3822* (2015.01)
*B60R 16/03* (2006.01)

(56) References Cited

U.S. PATENT DOCUMENTS

| | | | |
|---|---|---|---|
| 8,392,051 B2 | 3/2013 | Holzinger et al. | |
| 8,682,401 B2 | 3/2014 | Ebner et al. | |
| 2003/0083024 A1* | 5/2003 | Richenstein | H04H 20/62 455/99 |
| 2004/0127206 A1* | 7/2004 | Van Bosch | H04W 52/0216 455/418 |
| 2004/0198255 A1* | 10/2004 | Hayashida | B60R 25/102 455/99 |
| 2004/0203340 A1* | 10/2004 | Oesterling | G07C 5/085 455/9 |
| 2004/0203767 A1* | 10/2004 | Fraser | H04W 60/02 455/435.1 |
| 2006/0152060 A1 | 7/2006 | Nagayama | |
| 2006/0197654 A1* | 9/2006 | Kouchiyama | H04W 52/0274 340/436 |
| 2008/0278345 A1* | 11/2008 | Van Bosch | H04B 7/18517 340/870.07 |
| 2010/0136944 A1* | 6/2010 | Taylor | B60R 25/00 455/404.1 |
| 2011/0178654 A1* | 7/2011 | Bauerle | H01M 10/42 701/2 |
| 2012/0242288 A1* | 9/2012 | Birke | B60L 11/1809 320/109 |
| 2016/0105365 A1* | 4/2016 | Droste | H04L 67/12 370/236 |
| 2016/0288744 A1* | 10/2016 | Rutherford | B60L 1/00 |
| 2016/0337937 A1* | 11/2016 | McCann | H04L 45/64 |
| 2016/0368507 A1* | 12/2016 | Geissenhoner | F02N 11/0807 |
| 2017/0094605 A1* | 3/2017 | Dalke | H04W 52/0274 |
| 2017/0134554 A1* | 5/2017 | Lee | H04L 12/46 |

FOREIGN PATENT DOCUMENTS

| | | |
|---|---|---|
| DE | 102005027018 A1 | 11/2006 |
| DE | 102007018830 A1 | 12/2008 |
| DE | 102007046944 A1 | 4/2009 |
| DE | 102006024634 B4 | 8/2012 |
| WO | WO 2006/119976 A1 | 11/2006 |
| WO | WO 2007/028624 A1 | 3/2007 |

OTHER PUBLICATIONS

International Preliminary Report on Patentability directed to related International Patent Application No. PCT/EP2015/001092, with attached English-language translation, dated Apr. 29, 2016; 37 pages.
English-language Abstract of German Patent Application Publication No. 10347839 A1, published Apr. 28, 2005; 1 page.
English-language Abstract of German Patent Application Publication No. 102005027018 A1, published Nov. 16, 2006; 1 page.
English-language Abstract of German Patent Application Publication No. 102007046944 A1, published Apr. 9, 2009; 1 page.
English-language Abstract of International Application Publication No. 2006/119976 A1, published Nov. 16, 2006; 2 pages.
English-language Abstract of International Application Publication No. 2007/028624 A1, published Mar. 15, 2007; 1 page.

\* cited by examiner

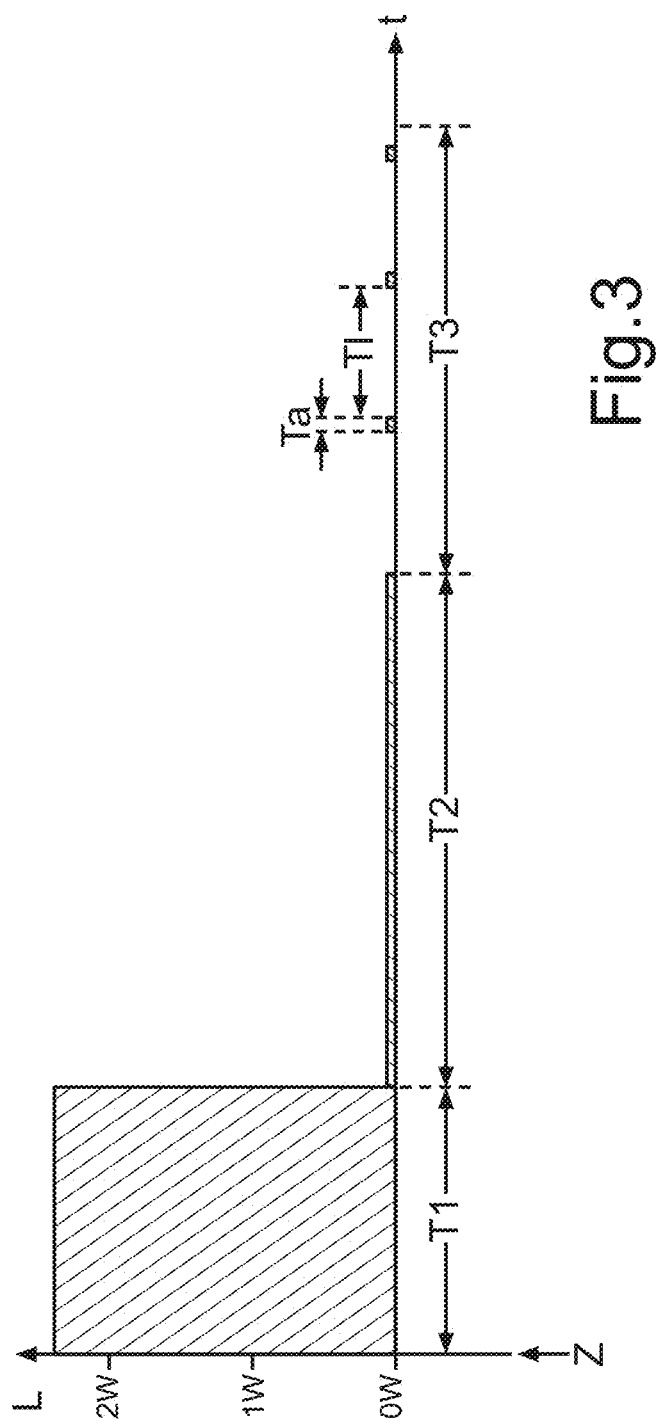

ECONOMICAL MOTOR VEHICLE OPERATION DURING A PARKED PHASE

TECHNICAL FIELD

The invention relates to a control unit for a motor vehicle as well as to a method for operating the control unit during a parked phase of the motor vehicle. In the parked phase, the ignition of the motor vehicle is switched off, so that electrical devices of the motor vehicle can be supplied with electrical energy exclusively via an electrical energy storage device of the motor vehicle, for example, a battery. Therefore, for the initiation of the parked phase in the motor vehicle, an ignition-off signal is transmitted, which causes the devices to reduce the energy consumption thereof, in order to conserve the energy storage device of the motor vehicle. In the control unit according to the invention, it is nevertheless possible that a service routine can continue to be carried out.

BACKGROUND

In particular, nowadays it is particularly desirable that a motor vehicle also offers a so-called remote service, in which the motor vehicle can be controlled from outside, for example, via the Internet. As service routine, it must thus be ensured that the motor vehicle responds to control commands from outside. For such remote services, control units nowadays often remain permanently logged in, for example, in a cellphone network, and wait for incoming SMS messages (SMS—Short Message Service) or an incoming call. In order to be able to offer this function in a parked motor vehicle for a duration of several months, a very large battery has to be built in.

On this topic, it is known from WO 2006/119976 A1 to receive a wake-up signal by means of a vehicle-side receiver of a radio remote control, wherein at least one wireless communication module of the motor vehicle is woken up by the wake-up signal. Thus, the communication module can first be switched off during a parked phase, and only the receiver of the radio remote control has to be supplied permanently with electrical energy.

From WO 2007/028624 A1, it is known to provide a motion sensor in a motor vehicle and to switch a locating device of the motor vehicle between a sleep mode and an operating mode by means of the motion sensor. The locating device is activated as a function of a movement of the motor vehicle and it then sends location coordinates by text messages (SMS) via a mobile radio module.

From DE 103 47 839 A1, it is known, after the initiation of a parked phase, to first continue to operate a control unit in a follow-up mode for a certain time span, and to terminate a data transmission connection and deactivate a communication unit only after the expiration of the time span. As a result, the motor vehicle remains controllable in the follow-up mode by radio from outside the motor vehicle.

From DE 10 2006 024 634 B4, a method for wireless transmission of infotainment components between a vehicle network in a vehicle and a vehicle-external network is described. The vehicle network has a ready-to-receive state and a rest state, wherein, via a remote control of the vehicle, a switch is made from the rest state to the ready-to-receive state.

The methods for switching between a rest state and a ready-to-receive state known from the prior art are based on the continuous operation of a receiver which can generate a wake-up signal in the motor vehicle. For the case in which a motor vehicle remains parked for several weeks or months, that is the parked phase lasts that long, the continuous operation of a receiver also leads to a discharge of the vehicle battery, as a result of which the ability of the motor vehicle to restart can be impaired.

In DE 10 2007 046 944 A1, a pressurized air supply device with leakage analysis is described. A pressurized air supply module comprises a control unit with a wake-up circuit that is connected to an external timer. The timer issues wake-up signals to the control unit with a wake-up circuit, and, in the case of reception of the wake-up signal, the control unit carries out a measurement of a system pressure in the motor vehicle, while the ignition of the utility vehicle is switched off.

From DE 102 55 449 A1, a device for waking up a control unit in a motor vehicle is described. In the device, wake-up means in the rest state are not supplied with current, but instead they have their own dischargeable energy storage device.

SUMMARY

The object of the present invention is to make possible, in a motor vehicle, an economical operation during a parked phase and in doing so carry out a service routine in the motor vehicle.

The object is achieved by the subject matters of the independent claims. Advantageous developments of the invention result from the features of the dependent claims.

According to the invention, a control unit of the motor vehicle has an electronic monitoring unit for performing the service routine. For example, the monitoring unit can be provided by a mobile radio module, the service routine of which can include verifying whether new SMS messages are present. The monitoring unit is supplied from the on-board electrical network, i.e., in the control unit, the monitoring unit is connected in a known manner via a power supply to the on-board electrical network of the motor vehicle, and the power supply is designed to supply the monitoring units with electrical energy from the on-board network. The on-board electrical network can be, for example, a low-voltage on-board network that provides a 12-volt supply voltage, for example.

In the method, the power supply separates the monitoring unit from the on-board network in a known way, if the ignition-off signal is present or transmitted in the motor vehicle. Due to the electrical separation of the monitoring unit from the on-board network, the monitoring unit is thus first switched off to begin with. The power supply thus represents a power controller, which, in the control unit, separately switches on individual components, in particular the monitoring unit.

In order to be able to perform the service routine then nonetheless during the parked phase, a clock with a timer is provided in the control unit according to the invention According to the method, the power supply sets the timer in the parked phase and then switches itself off. Advantageously, the energy consumption of the control unit is now reduced due to the electrical separation of the monitoring unit from the on-board network and the switching off of the power supply. But the clock continues to run. With the power supply is switched off, the timer generates a wake-up signal as a function of a time indication that is determined by the clock. The time indication can be, for example, the current time of day. The clock can also be designed as a counter, for example, as a count-down counter. The power supply comprises awake-up device which switches the power supply on again as a function of the wake-up signal. For example, the wake-up signal can be applied on a base or on a gate of a transistor, and the transistor can be switched through thereby feeding a supply current to the power supply. The power supply that has been switched on again then electrically connects the monitoring unit to the on-board network. In this way, the monitoring unit is operating again and can perform the service routine. A tinier value of the tinier can be set, for example, to 60 minutes, so that the power supply is switched on again by the timer after 60 minutes.

As a result of the invention, the advantage is obtained that, in the control unit, neither the operating unit nor the power supply needs to be operated continuously in order to be able to perform the service routine at certain predetermined times. Only the operation of the clock is necessary.

According to the method, it is provided here that the monitoring unit comprises a radio module, and the service routine includes that the radio module sets up a radio connection with a server outside the vehicle. Then, in a particularly advantageous way, a remote service for the remote control of the motor vehicle can be provided, by means of which a parameter in the motor vehicle can be set from outside.

It is particularly advantageous that the radio module receives a message signal that signals the presence of message data via the radio connection, and the radio module generates a wake-up signal in the control unit as a function of the message signal. Here, it is particularly advantageous that the radio module comprises a mobile radio module, that is to say, for example, a GSM module or a UMTS module or an LTE module. In a mobile radio module, it is sufficient if this mobile radio module logs itself into a mobile radio network in order to trigger thereby the server-side notification of message data. If messages are present, the mobile radio module then receives a status signal by means of which the generation of the wake-up signal can be triggered in the described manner. However, the radio module can also be a WLAN module (WLAN Wireless Local Area Network), for example, which sets up a radio connection with a communication network.

Then, if message data are present, meaning a message signal is thus present, the method thus provides that the power supply activates a main processor of the control unit as a function of the wake-up signal, and the message data are retrieved by the main processor via the radio connection, and the control unit is set as a function of the message data. In other words, the power consumption of the control unit remains low until message data are actually present. It is only when message data are present that the control unit is completely switched on by activating the main processor thereof, and then a configuration is carried out in the control unit based on the message data. The message data can comprise, for example, a configuration command for a parking heater, so that the user can set the parking heater of the motor vehicle or another control unit of the motor vehicle from outside the motor vehicle, for example, from a personal computer.

Optionally, the clock can be a so-called RTC (Real Time Clock). Such a clock can be supplied with electrical energy by an energy source that is different from the on-board network and that is provided in the control unit. For example, the clock can be supplied with electrical energy by a battery, for example, a button cell or an accumulator. In that case no electrical energy from the on-board network is needed at all for providing the time value-dependent waking function. However, a clock having its own energy source is not a must. Using a clock, as is needed for the invention, increases a current consumption only by less than a milli-amp, so that the on-board network can also be used.

The described wake-up mechanism can also be repeated cyclically. An embodiment of the invention provides that, after the performance of the service routine, the power supply that has been switched on again electrically separates the monitoring unit again from the on-board network, that is to say it switches it off, resets the timer, and switches itself off again. In other words, now only the clock is operating, which switches the power supply on again in accordance with the set tinier value, thus, for example, again after 60 minutes or in general after a rest phase. In this way, over a relatively long time period, for example, several weeks or several months, the power supply can be switched on at predetermined time intervals, and the monitoring unit can then be switched on by the power supply for performing the service routine.

In order to further lower the energy consumption, an embodiment of the invention provides that the power supply that has been switched on again is active during the performance of the service routine, that is to say while the monitoring unit is active, sets the tinier as well, and switches itself off. In other words, the monitoring unit thus remains active and the power supply switches itself off. However, in the process the monitoring unit remains electrically connected to the on-board network, so that the monitoring unit can again perform the service routine.

Advantageously, the power supply counts the repetitions of the service routines carried out since the ignition-off signal, by means of a repetition counter. Accordingly, the timer value in the timer is set as a function of the repetition counter. As a result, advantageously, for example, a time interval between the individual performances of the service routine can be set as a function of a temporal distance from the ignition-off signal. For example, a first timer value can be used for a predetermined first time period, for example, during the first week, and a preferably larger second timer value can be used during a subsequent second time period, that is to say, for example, after the first week. The time intervals between the repetitions of the service routine become larger as a result.

In order to not exhaust the storage capacity of a vehicle battery of the motor vehicle by the operation of the control unit during the parked phase, an embodiment provides for storing a maximum value for the performance of the service routine in the control unit. A number of the repetitions of the service routine is then limited by the power supply as a function of the maximum value. The maximum value can thus indicate, for example, the maximum number of repetitions or the maximum number of performances of the service routine.

With regard to the service routine, a plurality of different functionali ties can be provided by the invention, which the control unit performs automatically during the parked phase. For example, as a service routine, a temperature monitoring in a motor vehicle interior can be provided. The control unit then monitors whether the temperature is within a predetermined temperature range and otherwise activates, for example, an air conditioning unit or opens a sliding roof in order to allow hot air to escape. In general, a service routine is understood to mean that the monitoring unit acquires an actual value of a predetermined parameter and, as a function of the actual value, it either does nothing or triggers a function in the control unit.

As already described, the invention also includes a control unit that comprises the respective components described in connection with the embodiments of the method according to the invention. The control unit according to the invention is designed accordingly to implement the respective embodiment of the method according to the invention.

Finally, the invention further relates to a motor vehicle that comprises at least one embodiment of the control unit according to the invention. The motor vehicle according to the invention is preferably designed as a car, in particular a passenger car.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

Figure 2:
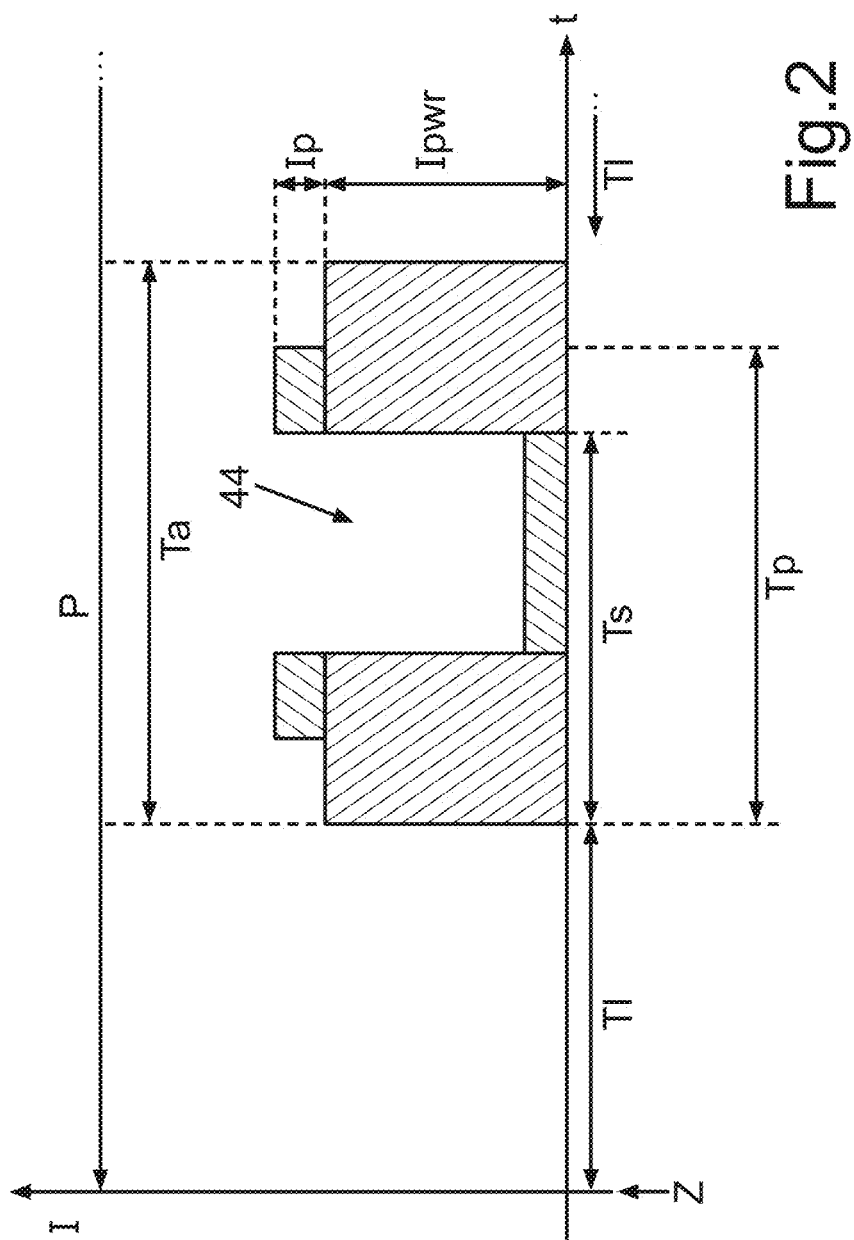

Below, an embodiment example of the invention is described. The figures show:

FIG. 1 a schematic representation of an embodiment of the motor vehicle according to the invention;

FIG. 2 a diagram with a schematized time course of a current consumption of the control unit of FIG. 1, during the implementation of an embodiment of the method according to the invention, FIG. 3 a diagram with a schematized time course of a power consumption value, as can result during the implementation of an embodiment of the method according to the invention in the motor vehicle of FIG. 1.

DETAILED DESCRIPTION

The embodiment example explained below is a preferred embodiment of the invention. However, in the embodiment example, the described components of the embodiment in each case represent individual features of the invention that should be considered independently of one another and that in each case also develop the invention independently of one another and thus also should be considered a component of the invention, individually or in a combination other than the combination shown. Moreover, the described embodiment can also be completed by other features of the invention that have already been described.

FIG. 1 shows a motor vehicle 10 which, for example, can be a car such as a passenger car. In the motor vehicle 10, a control unit 12 can be found, which is preferably an infotainment control unit. The control unit 12 can be connected via a bus connector or bus connection 14 to a communication bus of the motor vehicle 10, for example, to a CAN bus (CAN Controller Area Network) or to a FlexRay bus. The control unit 12 can be connected via a supply connection 18 to an on-board network 20 of the motor vehicle 10. The on-board network 20 can be designed to electrically connect the supply connection 18, for example, via copper cables, to a vehicle battery 22 of the motor vehicle 10.

In the example shown, the motor vehicle 10 is in a switched off state, that is to say, an ignition of the motor vehicle 10 is switched off and the devices (not shown) of the motor vehicle 10 are in a rest mode or switched off. For this purpose, in order to initiate the parked phase, an ignition-off signal Z has been transmitted via the communication bus 16 in the motor vehicle 10. The bus connection 14 has received the ignition-off signal Z. Via an ignition-on signal, the devices of the motor vehicle 10 can be woken up or activated.

In the control unit 12, in order to provide a functionality of the control unit, for example, for providing infotainment functions, it is thus possible to provide a main computer 24 with a main processor 26 as well as a radio module 28, for example, a mobile radio module PHN. Via the radio module 28, the control unit 12 can set up a radio connection 30 with a data source 32 outside the vehicle, for example, a server, in a mobile radio network or the Internet. The main computer 24 and the radio module 28 can be switched on and off by a power supply or a power controller 34, in that the power controller 34 electrically connects the main computer or respectively the radio module 28 to the supply connection 18, or electrically separates it from said supply connection.

When the ignition-off signal Z is received, this is signaled to the power controller 34 by the bus connection 14. The power controller 34 subsequently switches the main computer 24 and the radio module 28 off, in order to reduce the energy consumption of the control unit 12.

The control unit 12 is moreover provided with a real time clock RTC, that is to say a clock 36. Before the control unit 12 goes to sleep, which also means that the power controller 34 switches itself off, that is to say it goes into a standby mode, which means that a processor of the power controller 34 is switched off, a tinier 38 of the clock 36 is programmed to a time value or timer value Tl (timer long). After the configuring of the timer 38, the power controller 34 is also switched off, and as a result, an energy consumption or power consumption of the control unit 12 is set to a minimum. When the timer 38 has run its course, the clock 36 generates awake-up signal A, which is transmitted to a wake-up device 40 of the power controller 34. For example, a transistor in the power controller 34 can be switched into a conductive state by the wake-up signal A. After the switching on, the power controller 34 performs a control routine by means of which the radio module 38 is switched on for a time period Tp (time phone).

After the Tp has expired, the timer 38 is again set for the timer value Tl by the power controller 34, and the control unit 12 again goes to sleep. The sequence is repeated cyclically up to a maximum number that can be stored in a maximum value storage device 42.

During the time period Tp, the radio connection 30 with a server, i.e., the data source 32, can be set up by the radio module 28, which can be, for example, an intelligent mobile radio module with its own processor device, and the server can be queried as to whether a task, that is to say a control command, for the control unit 12 is present. This task could be, for example, the programming of a parking heater.

Since the control unit 12 is operated only for the duration of the querying for a task and optionally for the carrying out of the task, but otherwise the current consumption of the control unit 12 is minimized, the result is a longer availability of the wake-up function of the control unit 12 during the parked phase.

While the radio module 28 is active in the described manner, current can be saved additionally in that the power controller 34 programs the timer 38 for a timer value Ts (timer short) and then the power controller 34 goes into the rest mode, while the radio module 28 continues to be operated. For this purpose, in FIG. 2, the current consumption I of the control unit 12 is plotted versus time t during the parked phase P. For the rest phases of duration Tl, the control unit 12 consumes a minimal amount of current, which can be, for example, less than 100 milliamps, in particular less than ten milliamps. After the expiration of the timer value Tl and switching on of the power controller 34, the power controller 34 consumes the consumption current Ipwr. By switching on the radio module 28, the consumption current Tp of the radio module 28 is also added. In an intermediate phase 44, the power controller 34 can be switched off until the timer value Ts has expired. Thereafter, the power controller 34 is activated again, so that it can switch off the radio module 28 after the time Tp. Subsequently, the timer 38 is again set to the timer value Tl, and the control unit 12 is again deactivated. This behavior is limited by the value in the maximum storage value 42.

When a message 46 is received during Tp by the radio module 28, for example, an SMS message, the control unit 12 is woken up by a wake-up line, that is to say the radio module 28 generates a start signal S, which can be transmitted, for example, to the power controller 34. Subsequently, by means of the power controller 34, or in general, in the control unit 12, for example, by means of the main computer 34, a communication channel to the data source 32 can be set up via the radio connection 30, for example, on the basis of a communication protocol such as the HTTP (Hyper Text Transfer Protocol). As a result, it is possible then to receive task data 48 by means of the main computer 34 by operating programs executed by the main processor 26 of said main computer, and corresponding configurations in the control unit 12 can be carried out. The message 46 thus represents a message signal that signals that task data 48, that is to say the actual message data, are available in the data source 32.

If, within the course of Ts, no message 46 is received, the clock 36 wakes up the power controller 34 and the latter switches the radio module 28 off again, programs the timer 38 with the timer value Tl, and then again goes to sleep accordingly for Tl. Overall, this results thus in an activity time Ta, which can be two minutes, for example. The duration between two activity phases of length Ta can be, for example, in a range between one minute and, for example, 3 days or one week.

In FIG. 3 it is shown how the described method is embedded in a strategy for providing an adequate response time of the control unit 12 to a message 46 for a remote service of the control unit 12. On this topic, in FIG. 3, the power consumption L of the control unit 12 is plotted versus time t. According to FIG. 3, in the strategy, as a function of the ignition-off signal Z, the control unit 12 first continues to be operated in a normal operating mode for a first time duration value Tl, wherein, in the normal operating mode, the main processor 24 and the radio module 28 are active, and thus the message 46 can be received immediately by the radio module 28 and processed by the main computer 24. In a subsequent observation phase, the radio module 28 is operated for a time duration 12, but with main computer 24 switched off. As a result, if a message 46 is present, this message is transmitted immediately to the radio module 28, whereafter the main computer 26 can be switched on by the generation of the start signal S. Subsequently, for a time duration T3, the described cyclic waking up of the control unit 12 is carried out, so that, in each case, for the wake-up phase, the message 46 can be retrieved by the radio module 28 via the radio connection 30 within the time duration Ta. The time duration T3 results from the maximum value in the maximum value storage device 42.

Overall, the example shows how, by means of the invention, an infotainment control unit can wake up cyclically and log onto a server in order to offer a remote service.

The invention claimed is:

1. A method, comprising:
operating a control unit of a motor vehicle during a parked phase in which an ignition of the motor vehicle is switched off, wherein the control unit comprises:
an electronic monitoring unit comprising a mobile radio module, wherein the electronic monitoring unit is configured to perform a service routine, the service routine comprising setting up a radio connection with a server outside the motor vehicle using the mobile radio module, and
a power supply for supplying the electronic monitoring unit with electrical energy from an on-board electrical network of the motor vehicle, wherein the power supply electrically separates the electronic monitoring unit from the on-board electrical network as a function of an ignition-off signal transmitted in the motor vehicle for initiation of the parked phase;
setting a timer of a clock on the control unit to a first time by the power supply during the parked phase, wherein the power supply switches off after setting the timer of the clock on the control unit to the first time;
generating a first wake-up signal as a function of a current time indication determined by the clock on the control unit;
switching the power supply on as a function of the first wake-up signal using a wake-up device of the power supply;
electrically connecting the electronic monitoring unit to the on-board electrical network using the power supply after the power supply has been switched on as a function of the first wake-up signal;
receiving, at the mobile radio module, a message signal signaling a presence of message data via the radio connection;
generating, at the mobile radio module, a second wake-up signal as a function of the message signal;
activating, at the power supply, a main processor of the control unit as a function of the second wake-up signal;
retrieving, using the main processor, the message data via the radio connection; and
setting the control unit as a function of the message data, wherein the power supply counts repetitions of the service routine carried out since the ignition-off signal using a repetition counter and sets the timer of the clock on the control unit to a second time as a function of the repetition counter.

2. The method according to claim 1, wherein the clock on the control unit is supplied with electrical energy by an energy source, and wherein the energy source is distinct from the on-board electrical network and the control unit.

3. The method according to claim 1, further comprising:
electrically separating, at the power supply, the monitoring unit from the on-board electrical network after: the performance of the service routine, resetting the timer, and switching the power supply off.

4. The method according to claim 1, further comprising:
setting the timer of the clock on the control unit to a third time during the performance of the service routine at the power supply;
switching the power supply off a second time after setting the timer to the third time; and
electrically connecting the monitoring unit to the on-board electrical network.

5. The method according to claim 1, wherein the first time is a first predetermined value and the second time is a second predetermined value that is larger than the first predetermined value.

6. The method according to claim 1, further comprising:
storing, at the control unit, a maximum value for the repetitions of the service routine; and
limiting a number of the repetitions of the service routine, by the power supply, as a function of the maximum value.

7. A control unit for a motor vehicle, comprising:
a clock with a timer, wherein a first wake-up signal is generated as a function of a current time indication determined by the clock;
an electronic monitoring unit comprising a mobile radio module that is configured to receive message signals and generate a second wake-up signal upon receiving a first message signal via a radio connection, the first message signal indicating message data is present, the electronic monitoring unit configured to perform a service routine that comprises setting up the radio connection with a server outside the motor vehicle using the mobile radio module;
a power supply for supplying the electronic monitoring unit with electrical energy from an on-board electrical network of the motor vehicle, the power supply comprising a wake-up device for switching the power supply on as a function of the first wake-up signal and a repetition counter, wherein the power supply is configured to:
set the timer of the clock to a first time during a parked phase in which an ignition of the motor vehicle is switched off,
switch off the power supply after setting the timer of the clock to the first time,
connect the electronic monitoring unit to the on-board electrical network of the motor vehicle,
count repetitions of the service routine carried out since the ignition of the motor vehicle was switched off, and
set the timer of the clock to a second time as a function of the repetition counter; and
a main processor configured to be activated by the power supply as a function of the second wake-up signal and retrieve the message data via the radio connection.

8. The control unit of claim 7, wherein the clock is supplied with electrical energy by an energy source.

9. The control unit of claim 8, wherein the energy source is distinct from the on-board electrical network and the control unit.

10. The control unit of claim 7, wherein the power supply is configured to electrically separate the monitoring unit from the on-board electrical network at initiation of the parked phase.

11. The control unit of claim 7, wherein the first time is a first predetermined value and the second time is a second predetermined value that is larger than the first predetermined value.

12. A motor vehicle, comprising:
at least one control unit, wherein the control unit comprises:
a clock with a timer, wherein a first wake-up signal is generated as a function of a current time indication determined by the clock;
an electronic monitoring unit comprising a mobile radio module that is configured to receive message signals and generate a second wake-up signal upon receiving a first message signal via a radio connection, the first message signal indicating message data is present, the electronic monitoring unit configured to perform a service routine that comprises setting up a radio connection with a server outside the motor vehicle using the mobile radio module;
a power supply configured to supply the electronic monitoring unit with electrical energy from an on-board electrical network of the motor vehicle, the power supply comprising a wake-up device for switching the power supply on as a function of the first wake-up signal and a repetition counter, wherein the power supply is configured to:
set the timer of the clock to a first time during a parked phase in which an ignition of the motor vehicle is switched off,
switch off the power supply after setting the timer of the clock to the first time,
connect the electronic monitoring unit to the on-board electrical network of the motor vehicle,
count repetitions of the service routine carried out since the ignition of the motor vehicle was switched off, and
set the timer of the clock to a second time as a function of the repetition counter; and
a main processor configured to be activated by the power supply as a function of the second wake-up signal, wherein the main processor is configured to retrieve the message data via the radio connection.

13. The motor vehicle of claim 12, wherein the clock is supplied with electrical energy by an energy source.

14. The motor vehicle of claim 13, wherein the energy source is distinct from the on-board electrical network and the control unit.

15. The motor vehicle of claim 12, wherein the power supply is configured to electrically separate the monitoring unit from the on-board electrical network at initiation of the parked phase.

16. The motor vehicle of claim 12, wherein the first time is a first predetermined value and the second time is a second predetermined value that is larger than the first predetermined value.

* * * * *